(12) United States Patent
Walker et al.

(10) Patent No.: US 12,476,383 B1
(45) Date of Patent: Nov. 18, 2025

(54) INTEGRATED INFRARED IMAGING AND PASSIVE SEEKER SYSTEM FOR SMALL MUNITIONS APPLICATION

(71) Applicant: Rockwell Collins, Inc., Cedar Rapids, IA (US)

(72) Inventors: Anders P. Walker, Marion, IA (US); James B. West, Cedar Rapids, IA (US); Jason A. Fuemmeler, Cedar Rapids, IA (US); Guy Squillace, Prior Lake, MN (US); Gary Willenbring, Waconia, MN (US); Orion D. Davies, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 170 days.

(21) Appl. No.: 18/379,523

(22) Filed: Oct. 12, 2023

(51) Int. Cl.
*H01Q 21/06* (2006.01)
*F41G 7/22* (2006.01)
*H01Q 1/28* (2006.01)

(52) U.S. Cl.
CPC .......... *H01Q 21/061* (2013.01); *F41G 7/226* (2013.01); *F41G 7/2293* (2013.01); *H01Q 1/286* (2013.01); *F41G 7/2286* (2013.01)

(58) Field of Classification Search
CPC ...... H01Q 21/061; H01Q 1/286; H01Q 21/20; F41G 7/226; F41G 7/2293; F41G 7/2286
See application file for complete search history.

(56) References Cited

U.S. PATENT DOCUMENTS

| | | | | |
|---|---|---|---|---|
| 3,110,030 A | * | 11/1963 | Cole, Jr. ............. | H01Q 1/281 343/873 |
| 4,101,895 A | * | 7/1978 | Jones, Jr. ............. | H01Q 1/281 343/846 |
| 4,108,400 A | * | 8/1978 | Groutage ............. | H01Q 1/281 701/531 |
| 4,296,416 A | * | 10/1981 | Harader ............. | H01Q 21/20 343/846 |
| 4,594,595 A | * | 6/1986 | Struckman ............. | H01Q 21/20 343/770 |

(Continued)

FOREIGN PATENT DOCUMENTS

| AU | 2019284099 A1 | 1/2020 |
|---|---|---|
| EP | 2816311 B1 | 4/2020 |
| WO | 2006135416 A2 | 12/2006 |

*Primary Examiner* — Bernarr E Gregory
(74) *Attorney, Agent, or Firm* — Suiter Swantz IP (57) ABSTRACT

An integrated imaging and passive directional finding (DF) system for a guided munition or weapons platform includes an electro-optical infrared (EOIR) imager within a nosecone of the weapons platform and configured for imaging of a detected target. The passive DF system includes an array of long periodic array (LPA) antenna elements, each element disposed on a face of a tapered conical ground chassis having a polygonal cross section, the LPA antenna elements self-shielded from the EOIR imager and other electronic components by the ground chassis. Each LPA antenna element scans for signals of interest (SoI) within the ultra-wide band (UWB) frequency range. Geolocation or passive direction finding (DF) based on detected signals of interest may be performed to guide the weapons platform into imaging range of one or more targets of interest, where EOIR imaging may take over for target discrimination and aimpoint refinement.

20 Claims, 11 Drawing Sheets

(56) References Cited

U.S. PATENT DOCUMENTS

| | | | | |
|---|---|---|---|---|
| 4,980,692 A | * | 12/1990 | Rudish | H01Q 21/205 343/778 |
| 5,182,564 A | * | 1/1993 | Burkett | H01Q 1/281 342/53 |
| 5,317,323 A | | 5/1994 | Kennedy et al. | |
| 5,327,145 A | | 7/1994 | Jelinek | |
| 5,327,149 A | * | 7/1994 | Kuffer | H01Q 21/28 343/781 CA |
| 5,537,117 A | | 7/1996 | Rose | |
| 5,973,649 A | * | 10/1999 | Andressen | F41G 7/2293 343/756 |
| 6,054,950 A | | 4/2000 | Fontana | |
| 6,268,822 B1 | * | 7/2001 | Sanders | H01Q 1/281 343/753 |
| 7,183,966 B1 | * | 2/2007 | Schramek | F41G 7/2293 342/27 |
| 7,494,089 B2 | | 2/2009 | Williams et al. | |
| 7,532,170 B1 | * | 5/2009 | Lee | H01Q 1/281 343/705 |
| 8,179,317 B2 | | 5/2012 | Seifer et al. | |
| 9,316,463 B2 | * | 4/2016 | Durand | F41G 7/2293 |
| 10,892,796 B1 | | 1/2021 | West et al. | |
| 11,367,948 B2 | * | 6/2022 | Jordan | H01Q 21/0056 |
| 11,627,548 B1 | | 4/2023 | Passler et al. | |
| 11,682,842 B1 | | 6/2023 | West | |
| 2003/0038752 A1 | * | 2/2003 | Park | H01Q 21/205 343/757 |
| 2003/0043085 A1 | * | 3/2003 | Park | H01Q 21/205 343/895 |
| 2004/0070536 A1 | * | 4/2004 | Stotler | H01Q 1/281 343/700 MS |
| 2022/0163303 A1 | | 5/2022 | Willenbring et al. | |
| 2022/0345869 A1 | | 10/2022 | Ahrens | |
| 2023/0184963 A1 | | 6/2023 | Taber et al. | |

\* cited by examiner

INTEGRATED INFRARED IMAGING AND PASSIVE SEEKER SYSTEM FOR SMALL MUNITIONS APPLICATION

BACKGROUND

For missiles and other like guided munitions to perform with optimal effectiveness on the battlefield, the missile's guidance system should operate via purely passive methods but with sufficient target detection range and aimpoint accuracy. For example, an electronic seeker system may perform direction finding (DF) and geolocation of hostile signals of interest (SoI), providing location and direction data to the weapon guidance system. As range to the target decreases, imaging systems incorporating autonomous detection algorithms would provide the necessary aimpoint refinement. However, it has not yet been feasible to incorporate these two modalities within the compact volumes associated with small weapons platforms.

SUMMARY

In a first aspect, an integrated imaging and passive direction finding (DF) seeker system is disclosed. In embodiments, the imaging system includes an electro-optical infrared (EOIR; e.g., short wave IR (SWIR)) imager set into an electronics stack centrally mounted within the weapon nosecone, the EOIR imager configured for target discrimination and aimpoint refinement once a target is located and within imaging range. The passive DF sensor system includes a set of N log periodic array (LPA) antenna elements (e.g., where N is an integer and not less than three) and a tapered conical ground chassis sized to fit within the nosecone and having an N-sided polygonal cross section. Each side (e.g., lateral face) of the ground chassis has an LPA antenna element mounted thereto, the antenna elements self-shielded from the EOIR imager and from other processing/sensing systems within the electronics stack (e.g., active Ka-band/W-band radar seeker systems) by the ground chassis. The LPA antenna elements individually or collectively scan bands or sub-bands within the ultra-wide band (UWB) frequency range to identify signals of interest (SoI) associated with potential targets. RF processors and receivers of seeker system receive detection input from the LPA antenna elements and perform geolocation on identified SoI to guide the weapons platform toward potential targets and close enough for EOIR imaging of detected targets.

In some embodiments, the set of N LPA antenna elements is a set of microstrip LPA (MSLPA) elements.

In some embodiments, N is an even number (e.g., the set of LPA antenna elements is a set of 4 elements disposed on a square conical ground chassis, a set of 6 elements disposed on a hexagonal conical ground chassis, etc.)

In some embodiments, the set of N LPA antenna elements is split into N/2 "low-band" elements (e.g., for scanning in a lower frequency band or sub-band within the UWB range) alternating with N/2 "high-band" elements (e.g., for scanning in a higher frequency band or sub-band).

In some embodiments, the set of N LPA antenna elements is split into N/2 first LPA antenna elements disposed front-to-back on the ground chassis such that the phase center of the first LPA elements migrates forward (e.g., toward the nosecone apex) as the frequency scanned by the first LPA elements increases, alternating with N/2 second LPA antenna elements inversely disposed (e.g., back-to-front) on the ground chassis such that the phase center of the second LPA elements migrates rearward (e.g., away from the nosecone apex) as the frequency scanned by the second LPA elements increases.

In some embodiments, the set of N LPA antenna elements is split into a first set of LPA elements configured for polarization substantially perpendicular to the ground plane of the LPA element (e.g., to the embodying printed circuit board (PCB)), alternating with a second set of LPA elements configured for polarization substantially parallel to the ground plane of the LPA element (e.g., parallel to the longitudinal axis of the weapons platform, canted forward).

In some embodiments, the second set of parallel-polarization LPA elements is a set of microstrip monopole LPA (e.g., MSMPLPA) antenna elements.

In some embodiments, the full set of N LPA antenna elements is a set of microstrip monopole LPA (MSMPLPA) antenna elements.

In some embodiments, each LPA antenna element is configured for polarization substantially perpendicular to the ground plane of the LPA element (e.g., to the PCB).

In some embodiments, the set of N LPA antenna elements includes at least one LPA element configured for circular or elliptical polarization relative to the ground plane.

In some embodiments, the RF processors reorient the passive DF sensor system (e.g., via roll angle adjustment of the weapons platform) relative to one or more potential targets.

In some embodiments, one or more LPA antenna elements may be shadowed, or oriented away from an identified SoI, potential target, or underlying terrain. For example, the RF processors disregard detection input from any shadowed LPA element in favor of those elements oriented toward the target or toward the terrain.

In some embodiments, the LPA antenna elements provide single-ended input to the RF receivers and processors via dedicated RF channels, each RF channel including balanced/unbalanced (balun) circuitry for converting the single-ended detection input to a differential signal.

In some embodiments, the RF processors and receivers receive differential detection input from the LPA antenna elements.

In some embodiments, the set of N LPA elements is disposed on each side of the ground chassis in an aperiodically spaced relationship, e.g., each LPA element is aperiodically spaced relative to its two neighboring LPA elements on either side.

In some embodiments, the nosecone assembly includes a set of N dedicated radomes such that each LPA antenna element is disposed adjacent to and under a dedicated radome.

In some embodiments, one or more dedicated radomes are bandpass frequency selective surface (FSS) structures configured for passage of desired bands or sub-bands of the UWB frequency range and blocking of undesired bands or sub-bands.

In some embodiments, the bandpass FSS structures are tunable by the RF processors and receivers, such that each radome can be tuned to admit or block selected frequency bands or sub-bands.

In some embodiments, the set of N LPA antenna elements is collectively disposed adjacent to and underneath a single circumferential radome set into the nosecone.

In some embodiments, the integrated imaging and passive seeker system further includes an active RF seeker system. For example, active RF seeking (e.g., for improved range during terminal imaging phases) includes faceted directional RF elements mounted circumferentially around the EOIR optics (e.g., and canted forward for optimal field of view) and scanning in the Ka-band or W-band. Shared RF processors receive the active RF detection data as well as passive DF detection data, forwarding active RF detection data to the munition guidance system.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to a nosecone assembly for a guided missile or other like weapons platform incorporating within a limited form factor both passive ultra-wideband (UBW) direction finding (DF) and geolocation of targets of interest as well as target discrimination and aimpoint refinement via short-wave infrared (SWIR) imaging. Embodiments of the inventive concepts disclosed herein may further incorporate active seeker radar (e.g., Ka-band, W-band) within the same compact form factor. Further, passive DF may be achieved via compact circumferential antenna configuration that self-shields DF antenna elements from radio frequency (RF) and/or electro-optical (EO) interference associated with imaging and/or active seeker components.

Figure 1:
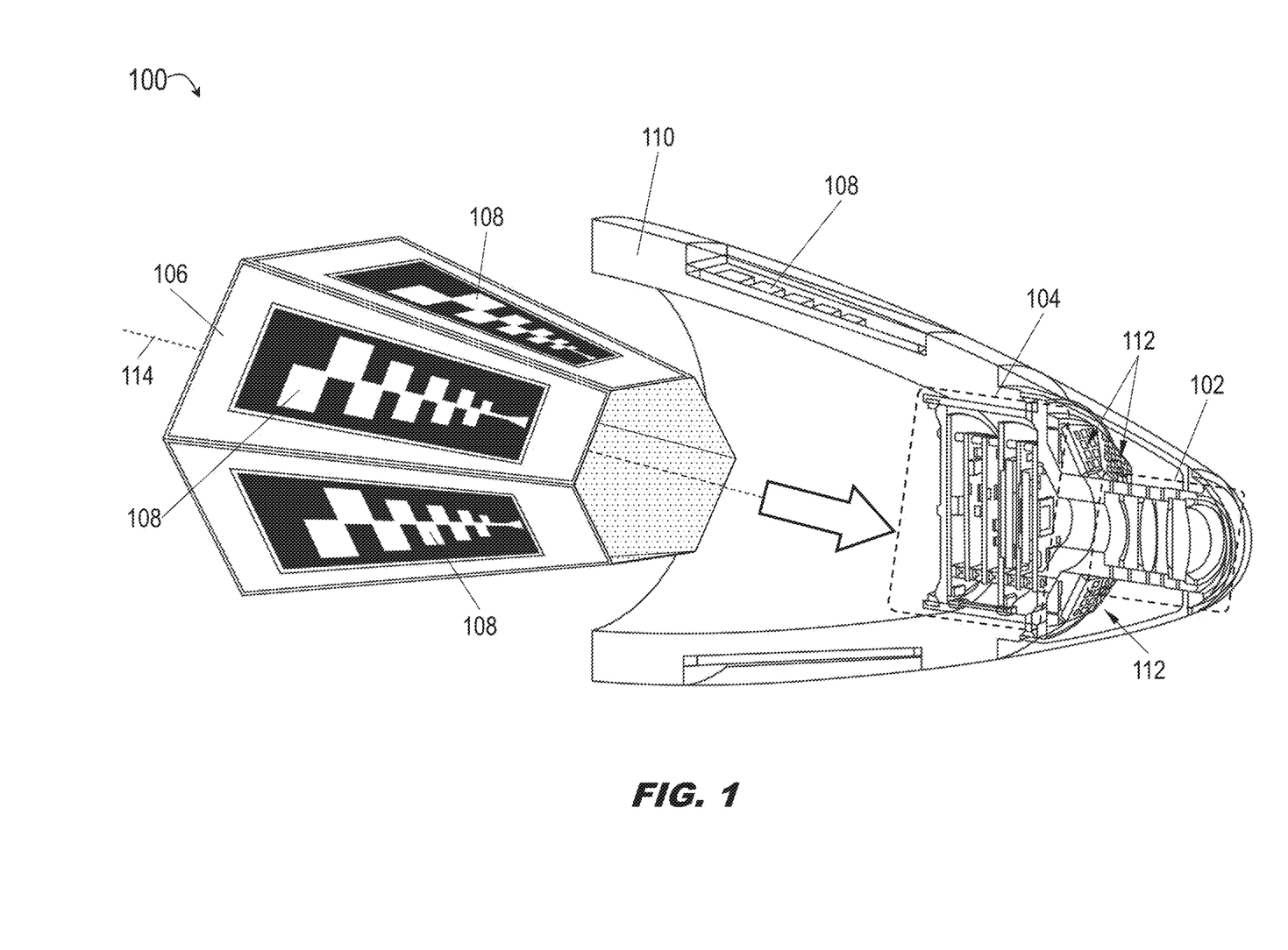
FIG. 1 is an isometric view of an integrated imaging and passive seeker system incorporating a directional finding (DF) antenna array according to example embodiments of this disclosure.

Referring now to FIG. 1, an integrated imaging and passive seeker system 100 for a guided missile or like guided munition is shown. The seeker system 100 may include optical elements 102, electronics stack 104, ground chassis 106, and directional finding (DF) antenna elements 108.

In embodiments, the seeker system 100 may combine a passive DF antenna array and electro-optical infrared (EOIR) imaging system within a small form factor compatible with a weapons nosecone assembly 110. For example, the seeker system 100 may preferably be sized to fit within a nosecone assembly 110 having a length not more than 330 mm (~13 in) and a diameter not more than 170 mm (~6.7 in), preserving interior volume within the guided munition for other subsystems. Further, the electronics stack 104 may include a modular architecture capable of accommodating small form factor transceiver components for the DF subsystem and multipurpose processors for the DF subsystem as well as the EOIR imaging system.

In some embodiments, the electronics stack 104 may further accommodate active seeker radar components, e.g., if the seeker system 100 includes active seeking. For example, the active seeker radar may include faceted directional RF antenna elements 112 mounted circumferentially around the EOIR optical elements 102 and canted for optimal field of view, e.g., based on mission parameters. The directional RF antenna elements 112 may include active electronically scanned array (AESA) antenna elements, sectional switched directional antenna elements, and/or any like equivalent antenna elements or combinations thereof. In some embodiments, the directional RF antenna elements 112 may be configured for scanning throughout the Ka-band (e.g., at frequencies between 26.5 and 40 GHZ) and/or the W-band (e.g., at frequencies between 75 and 110 GHz).

In embodiments, the ground chassis 106 may provide a ground plane for, and electromagnetic shielding of, the DF antenna elements 108 from integrated components of the seeker system 100 disposed within the ground chassis, e.g., active seeker RF elements 112 (e.g., where the seeker system includes active seeker radar), EOIR imaging system components, processors and receivers, and other like components of the electronics stack 104. Further, the ground chassis 106 may provide structural rigidity and serve as a heat sink for the electronics stack 104. Further still, the ground chassis 106 may incorporate rotational symmetry, facilitating versatile forward-looking and downward-looking (e.g., target-seeking and terrain-seeking) DF scanning.

Figure 2A:
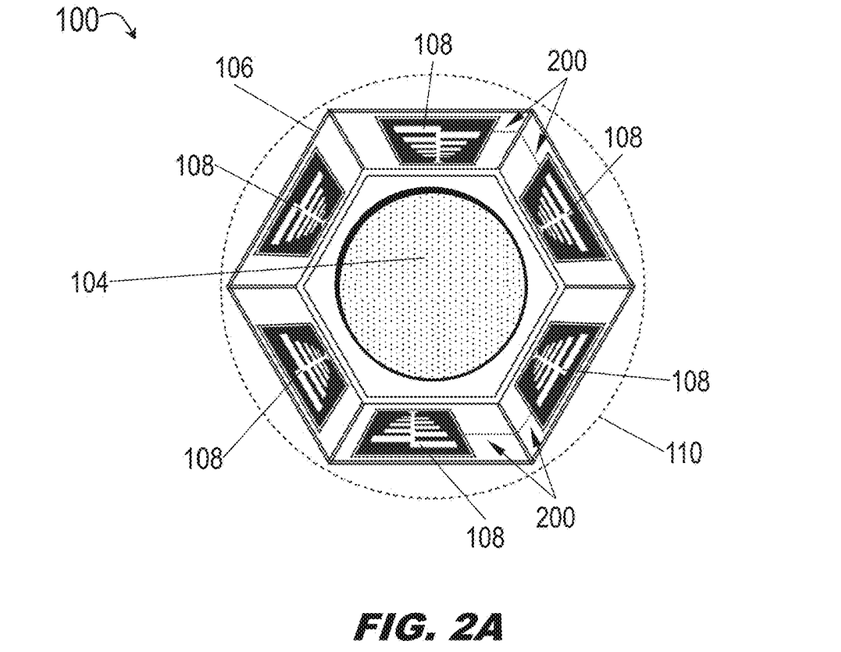
FIG. 2A is a longitudinal view of the seeker system and DF array of FIG. 1.

Referring now to FIG. 2A, the ground chassis 106 of the seeker system 100 is shown in a forward/longitudinal view.

In embodiments, the electronics stack 104 may be disposed within the ground chassis 106, and the DF antenna elements 108 may be mounted to the external surfaces of the ground chassis 106. For example, the ground chassis 106 may be a metallic conical structure tapering with the nosecone assembly 110 and having an N-sided polygonal cross section with respect to the longitudinal axis (114, FIG. 1) of the guided munition, where N is an integer not less than three. The seeker system 100 may include a set of N DF antenna elements 108, wherein each DF antenna element is mounted externally to a side of the ground chassis 106, e.g., a triangular ground chassis accommodating 3 DF antenna elements, a hexagonal ground chassis accommodating 6 DF antenna elements, an octagonal ground chassis accommodating 8 DF antenna elements. By way of a non-limiting example, further references to the seeker system 100 will assume a hexagonal ground chassis 106 and a set of 6 DF antenna elements 108.

In embodiments, each DF antenna element 108 may be a microstrip log periodic array (LPA, MSLPA,) element grounded and self-shielded by the ground chassis 106. For example, each LPA antenna element 108 may comprise a single-layer or dual-layer RF printed circuit board (PCB) capable of operating throughout the UWB frequency range (e.g., 2-18 GHz). In some embodiments, some or all DF antenna elements 108 may be configured for operations beyond this range, e.g., ~40 GHz.

In embodiments, one or more DF antenna elements 108 may be aperiodically (e.g., nonuniformly) spaced (200) relative to each other. For example, periodic or consistent center-to-center spacing of antenna elements within an array may introduce Bragg scattering, which may in turn adversely affect radar cross section (RCS), e.g., undesired reflectivity of antenna elements, which may render the antenna more susceptible to hostile detection.

In embodiments, and as disclosed in greater detail below, each LPA antenna element 108 may provide a single-ended detection input convertible by balanced-to-unbalanced (BALUN) circuits to a differential signal sent to RF receivers within the electronics stack 104 (e.g., Wideband Image Suppressing Receiver (WISR) or like RF integrated circuit (RFIC)). For example, each LPA antenna element 108 may preferably be sized at ~320 mm (~12.6 in) long and ~110 mm (~4.3 in) long based on the dimensions cited above for the seeker system 100 and ground chassis 106.

Figure 2B:
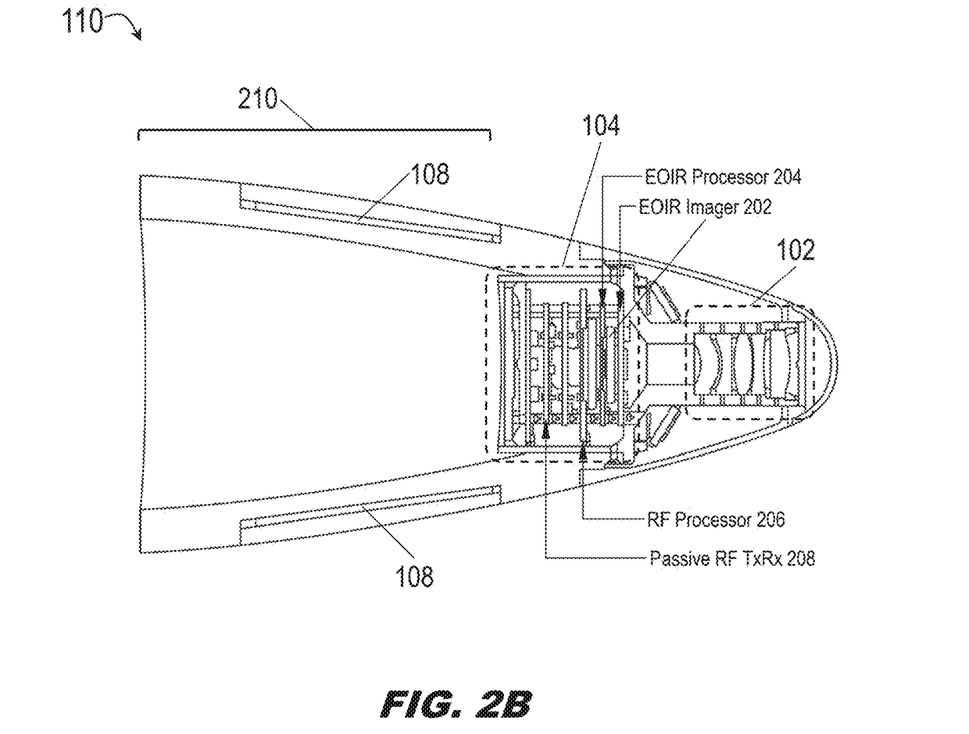
FIG. 2B is a cross sectional view of the optics and interior electronics stack of the seeker system of FIG. 1.

Referring now to FIG. 2B, the optical elements 102 and electronics stack 104 are shown within the nosecone assembly 110.

In embodiments, the electronics stack 104 may include circuit card assemblies (CCA) in a modular assembly providing for future expansion if desired or necessary. For example, the electronics stack 104 may include, in addition to the EOIR imager 202, an EOIR processor 204 configured for sensing and processing imaging data via the EOIR imager (e.g., short-wave IR (SWIR)). Further, the electronics stack 104 may include an RF processor 206 and passive RF transceiver 208 for use in conjunction with the DF antenna elements (108, FIG. 1) as well as other increased functionalities including, but not limited to, weapons datalink and/or telemetry. In some embodiments, RF processor/s 206 may further manage the use of active seeker radar, e.g., transmission and reception of RF energy via active directional antenna elements (112, FIG. 1).

In embodiments, the DF antenna elements 108 must fit within a limited amount of space 210 within the nosecone assembly 110. In embodiments, the DF antenna elements 108 may emit and receive RF energy within the ultra-wide band (UWB) frequency range, e.g., not less than 2 GHZ and not more than 18 GHz. With respect to the seeker system 100, different DF antenna elements 108 may be tuned to scan specific frequency bands or sub-bands within the UWB range as discussed below. In some embodiments, as noted above, one or more DF antenna elements 108 may be configured for operations at frequencies greater than 18 GHz.

Figure 3A:
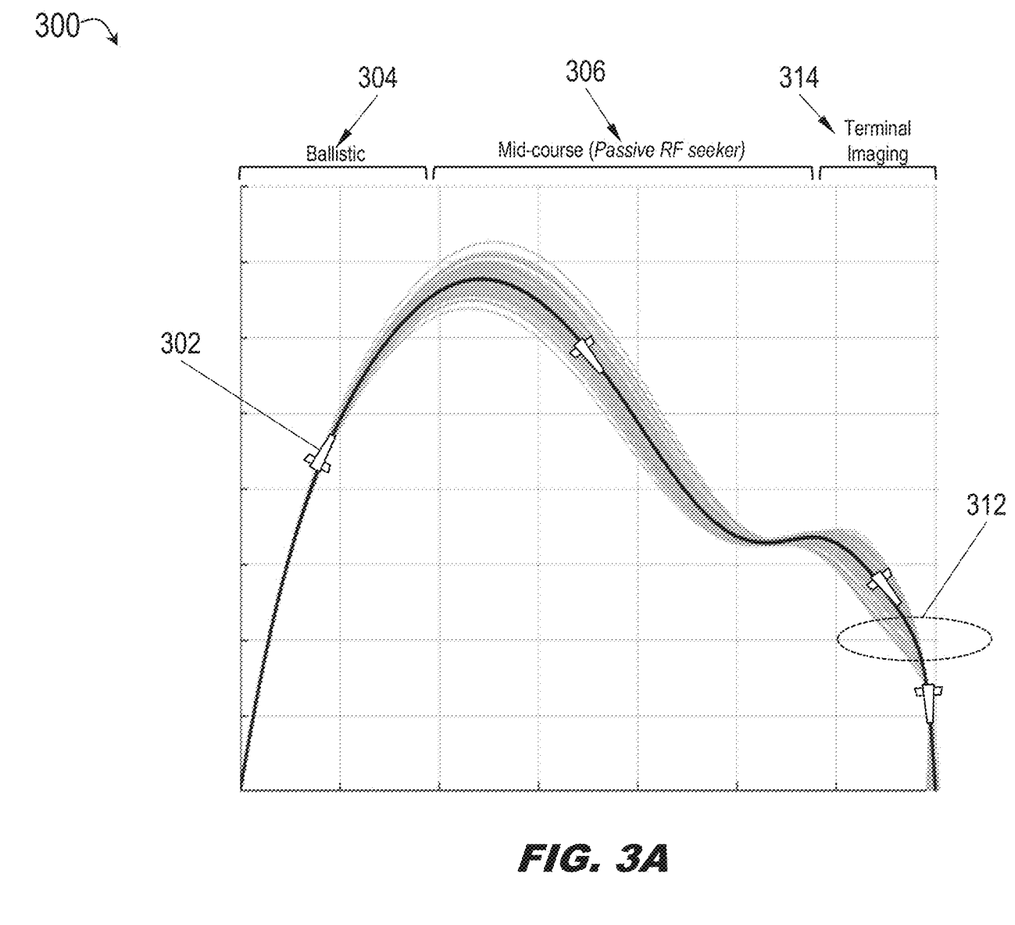
FIGS. 3A through 3C are diagrammatic illustrations of DF and targeting operations of the seeker system of FIG. 1.
Figure 3B:
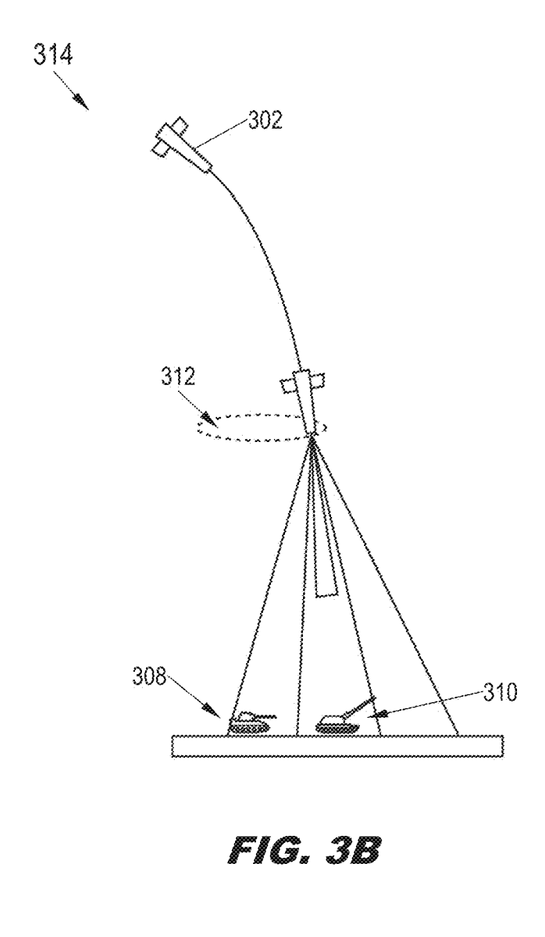
Figure 3C:
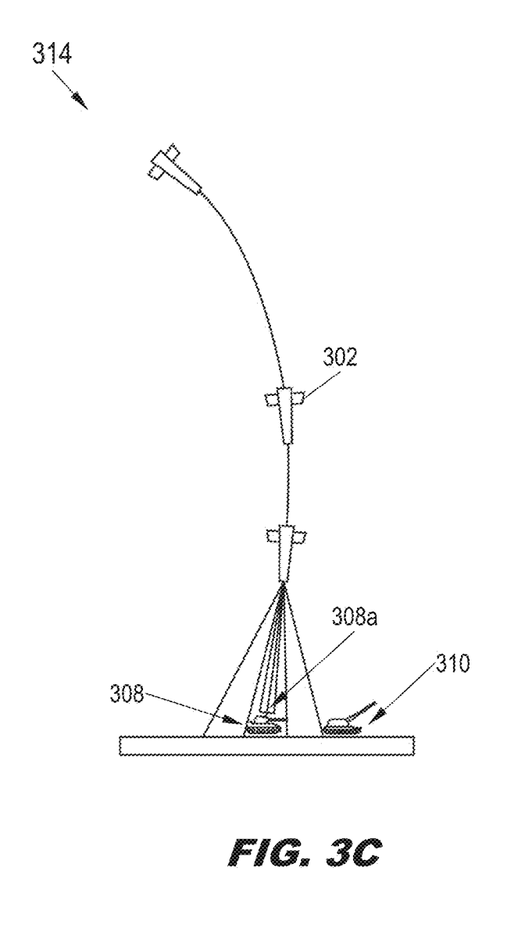

Referring now to FIGS. 3A through 3C, an exemplary trajectory 300 of the guided munition 302, as well as associated operations of the seeker system 100 throughout the trajectory, are shown.

In embodiments, subsequent to launch and initial boost phase 304 of the guided munition 302, the trajectory 300 may enter a mid-course phase 306 wherein the passive DF antenna elements (108, FIG. 1) scan for, detect, and identify signals of interest (SoI) likely corresponding to targets of interest. For example, targets of interest 308, 310 tend to be "loud emitters" whose associated SoI may be passively geolocated by the DF antenna elements 108 with sufficient accuracy for the EOIR imaging system (202, FIG. 2B) to detect, classify, and/or confirm a specific target upon reaching the shorter operating range of the imaging system. In some embodiments, with respect to mid-course detection 306, passive RF geolocation may benefit from half the travel distance required for active RF detection (e.g., via active RF elements 112, FIG. 1) due to the $r^2$ effect.

In embodiments, identification of signals of interest (SoI) via the passive DF antenna elements 108 may direct the guided munition 302 toward a seeker basket 312, or an airspace or volume within which targets of interest 308, 310 may be detected with sufficient accuracy to ensure a suitably high probability of engaging the targets of interest via the EOIR imaging system 202 for target discrimination and/or aimpoint refinement and robustness. For example, during this terminal imaging phase 314 of the trajectory 300, referring in particular to FIGS. 3B and 3C, the EOIR imaging system 202 may classify the identified targets of interest 308, 310 as, e.g., a primary target 308 and a secondary target 310. In embodiments, based on imaging data provided by the EOIR imaging system 202, during the terminal imaging phase 314 the guided munition 302 may be directed to a precise aimpoint 308a associated with the primary target 308. For example, referring in particular to FIG. 3B, the passive DF antenna elements 108 may continue to provide detection data associated with the detected SoI for the primary and secondary targets of interest 308, 310, which detection data may be fused by the seeker system 100 (e.g., by the RF processors 206, FIG. 2B or, in some embodiments, by the EOIR processors 204, FIG. 2B) with corresponding EOIR imaging data to assist the EOIR imaging system 202 in discriminating the primary target 308 and a refined aimpoint 308a thereon. In some embodiments, e.g., when an active RF seeker system is present, the active RF seeker elements (112, FIG. 1; e.g., Ka-band, W-band) may provide additional target location during the terminal imaging phase 314 through a larger region of interest relative to the EOIR imaging system 202.

Figure 4:
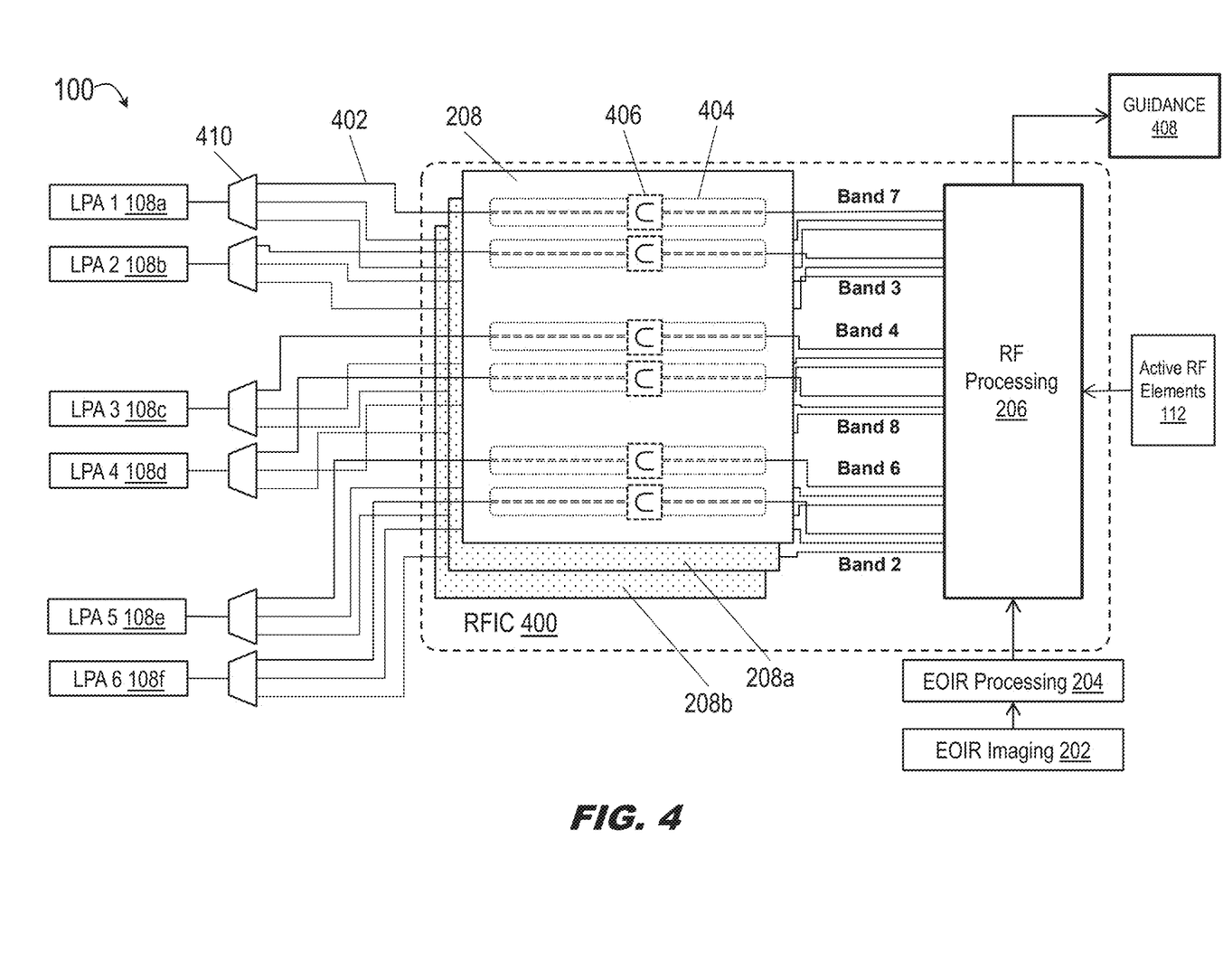
FIG. 4 is a block diagram illustrating the seeker system of FIG. 1.

Referring now to FIG. 4, the passive direction finding (DF) seeker system 100 is shown.

In embodiments, the seeker system 100 may include an RF integrated circuit 400 (RFIC) incorporating passive RF transceiver 208 and/or RF processing 206 functionalities. For example, each LPA antenna element 108a-108f may be tuned to scan a particular RF frequency band or sub-band within the UWB frequency range, resulting in detection input 402 provided by N parallel RF channels 404 to the passive RF transceiver 208 and RF processor 206.

In embodiments, the passive RF transceiver 208 and backend architecture and DF algorithms incorporated by the RF processor 206 may be implemented as disclosed by U.S. provisional patent application 63/469,203 filed May 26, 2023 and subsequent U.S. patent application Ser. No. 18/653,707, filed May 2, 2024, which applications are herein incorporated by reference in their entirety. For example, detection input 402 from each LPA antenna element 108a-108f may pass through the passive RF transceiver 208 via an independent parallel RF channel 404 for, e.g., amplification, mixing, and conversion from single-ended to differential via BALUN circuits 406 in each parallel RF channel. In some embodiments, LPA antenna elements 108a-108f may be individually or collectively configured for terrain-oriented (e.g., downward-looking) and/or skyward-oriented (e.g., forward-looking) scanning modes based on the polarization of each LPA antenna element (as disclosed in greater detail below). For example, a set of 6 LPA antenna elements 108a-108f may include a set of three LPA antenna elements configured for terrain-oriented scanning alternating with a set of three LPA antenna elements configured for forward-oriented scanning.

In some embodiments, the LPA antenna elements 108a-108f may be configured for differential input, eliminating the need for BALUN circuits 406 within the parallel RF channels 404.

In embodiments, a search mode of the seeker system 100 may provide that each LPA antenna element 108a-108f scans a predetermined frequency band or sub-band within the UWB range looking for signals of interest. For example, pulse descriptor words (PDW) may be generated for each of a pool of signals of interest (SoI) identified by the RF processor 206 based on detection input 402. Further, any detected SoI may be prioritized and direction finding (DF) performed by the RF processor 206 to determine directional data associated with a potential target of interest. For example, directional data may include an azimuth and/or elevation of the target of interest relative to the guided munition (302, FIGS. 3A-C). In embodiments, when a signal of interest is detected by an LPA antenna element 108a-108f and selected by the RF processor 206, the RF processor may lock in on the sub-band (e.g., parallel RF channel 404) associated with that LPA antenna element for further direction finding.

In some embodiments, the RF processor 206 may provide for tracking of multiple signals/targets of interest detected by multiple LPA antenna elements 108a-108f, e.g., via time division multiplexing (TDMA).

In embodiments, the seeker system 100 may include a passive-track mode wherein (e.g., at a predetermined time, or upon reaching a predetermined range from the target/s of interest 308, 310) any detected signals of interest may be prioritized against mission priorities (e.g., via mission processing). For example, LPA antenna elements 108a-108f and parallel RF channels 404 associated with higher priority signals of interest may be selected for additional direction finding.

In embodiments, the seeker system 100 may further include a sensor fusion mode. For example, when the guided munition 302 reaches the seeker basket (312, FIGS. 3A-C), directional data generated by the RF processor 206 based on detection input 402 from selected LPA antenna element/s 108a-108f and parallel RF channel 404 may be fused with imaging data sensed by the EOIR imaging system 202 (by the RF processor 206 or by the EOIR processor 204) and sent to the guidance system 408 of the guided munition, e.g., for target discrimination and/or aimpoint refinement. In some embodiments, e.g., when an active RF seeker system is present, the RF processors 206 may further receive active detection data collected via scanning (e.g., through the Ka-band or W-band) by the active RF directional antenna elements 112.

In some embodiments, the seeker system 100 may include multiplexers 410 for splitting each set of detection input 402 into multiple copies. For example, the seeker system 100 may include additional passive RF transceivers 208a, 208b and/or sets of parallel channels 404 therethrough, such that each set of detection input 402 is duplicated (e.g., or triplicated, etc.) and sent through multiple parallel RF channels for more effective direction finding.

Figure 5A:
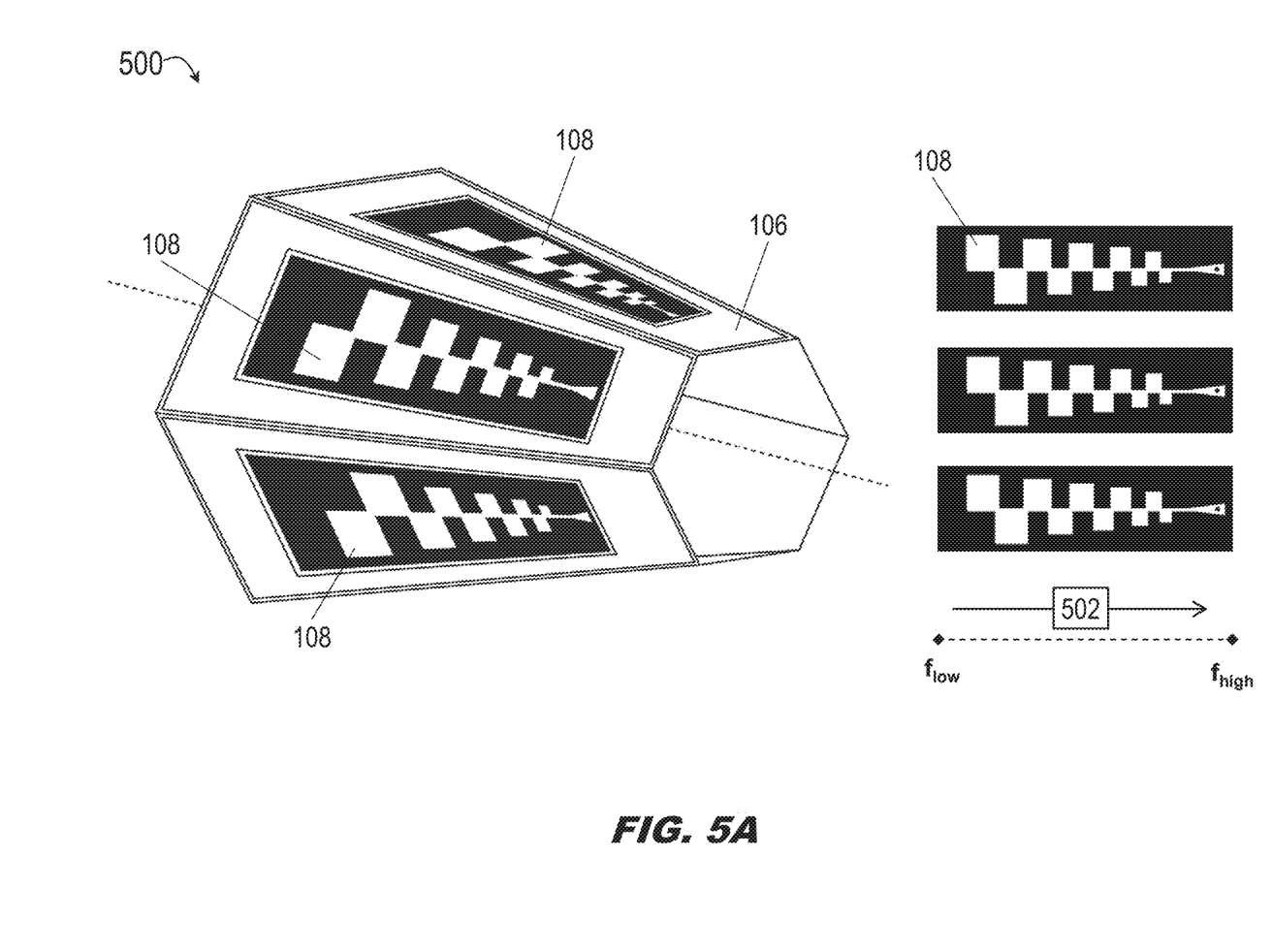
FIG. 5A is an isometric view of the seeker system of FIG. 1 illustrating phase center migration associated with the DF array.

Referring now to FIG. 5A, the passive DF array 500 of LPA antenna elements 108 is shown.

In embodiments, if each LPA antenna element 108 mounted to the ground chassis 106 radiates throughout the UWB frequency range, as noted above (e.g., 2 GHz to 18 GHz, or a selected sub-band thereof), the phase center of each LPA antenna element will migrate axially (502) as a function of frequency, e.g., the higher the frequency at which the LPA antenna element radiates, the further forward the feed input (e.g., toward narrower portions of the LPA antenna element 108) as shown in FIG. 5A. Similarly, as the radiation frequency decreases the phase center may migrate in the opposite/rearward direction. Further, the DF algorithms incorporated by the seeker system 100 utilize the set of N LPA antenna elements 108 (e.g., six MSLPA antenna elements 108a-108f, FIG. 4) as six single radiating elements in a circular array (wherein, e.g., four or five antennas of the six, or a comparable proportion of the N antennas, may be used for either terrain-looking or skyward-looking applications at any particular time). Accordingly, this phase center migration may affect the spacing and/or effective diameter of the circular array of LPA antenna elements 108 as seen or treated by the DF algorithms. In embodiments, the DF algorithms may deterministically account for phase center migration.

Figure 5B:
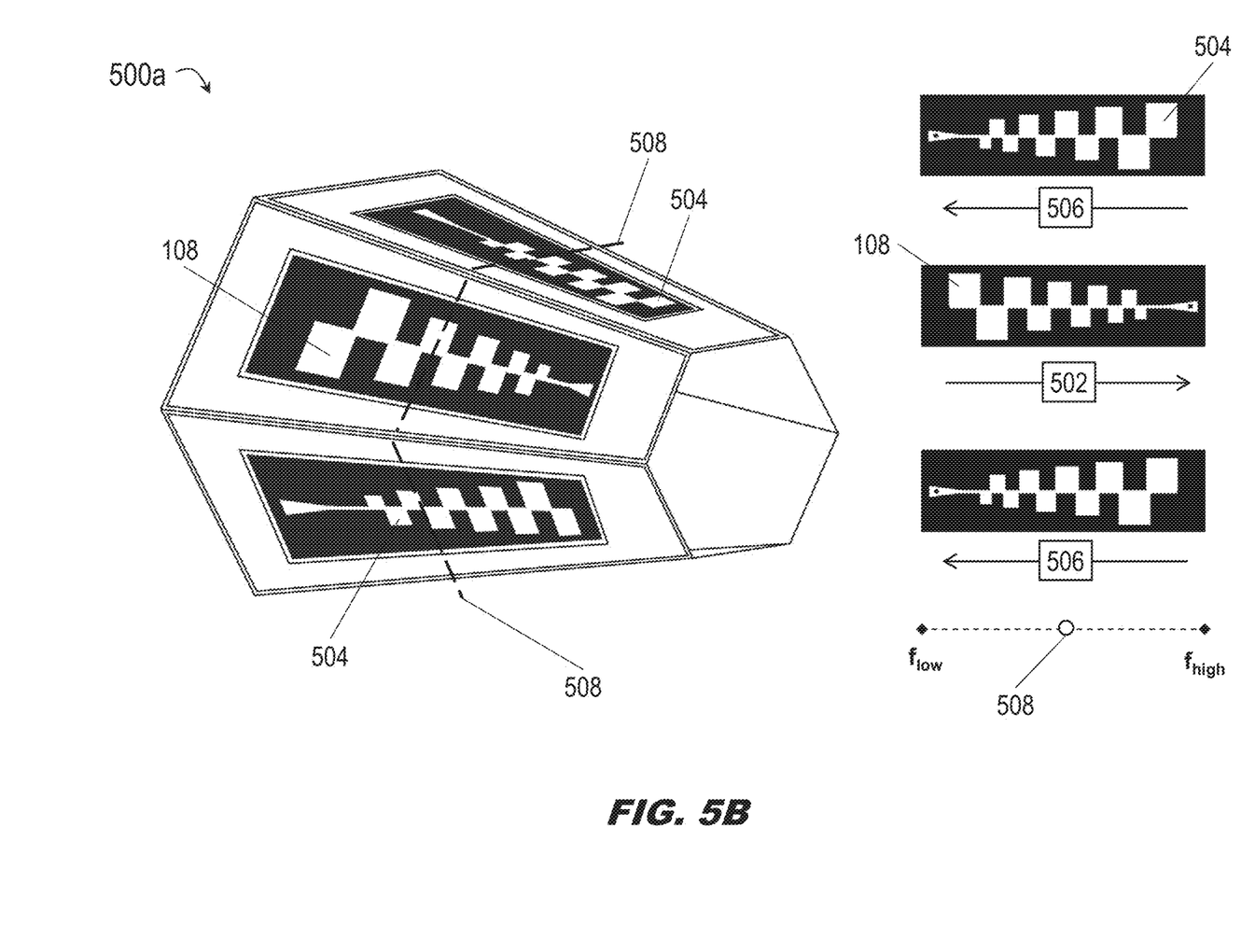
FIG. 5B is an isometric view of the seeker system of FIG. 1 wherein the DF array is reconfigured to mitigate the phase center migration shown by FIG. 5A.

Referring also to FIG. 5B, the DF array 500a of six LPA antenna elements 108 may be implemented and may function similarly to the DF array 500 of FIG. 5A, except that the DF array 500a may alternate the placement of LPA antenna elements to compensate for phase center migration.

In embodiments, the DF array 500a may comprise alternating or staggered "head-to-toe" LPA antenna elements 108, e.g., three LPA antenna elements 108 oriented on the ground chassis 106 as shown by FIG. 5A, e.g., wherein the phase center migrates forward (502) as the radiating frequency increases, alternating with three LPA antenna elements 504 implemented similarly to, but inverted relative to, the LPA antenna elements 108. For example, the three alternating LPA antenna elements 504 may be oriented on the ground chassis 106 such that the phase center migrates rearward (506) as frequency increases. In embodiments, the average phase center of the DF array 500a may tend to maintain a position toward the axial center 508 of the array (e.g., toward the center of the ground chassis 106) as radiating frequencies vary.

Figure 6A:
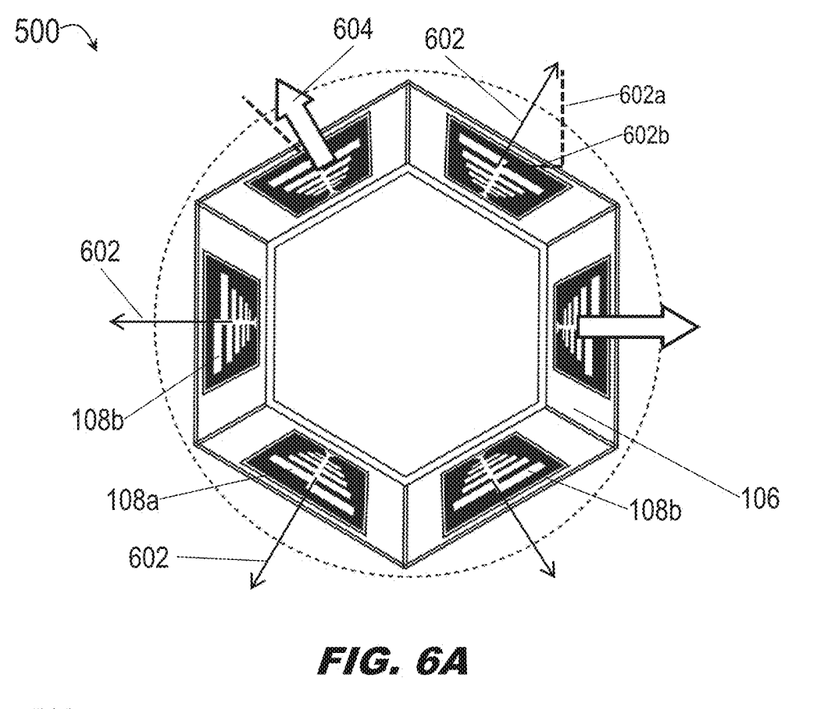
FIG. 6A is a longitudinal view of antenna polarization for the DF array of the seeker system of FIG. 1.

Referring now to FIG. 6A, the DF array 500 of LPA antenna elements 108 and ground chassis 106 are shown in longitudinal view.

In embodiments, the nominal peak radiation gain for each LPA antenna element 108 may be substantially perpendicular (602) to the face of the PCB of the antenna element, although when integrated into the ground chassis 106, the radiation pattern may cant slightly forward (604) toward the apex of the nosecone assembly (110, FIG. 1). Accordingly, the forward-looking field of view for the DF array 500 may be enhanced. Further, the perpendicular polarization 602 of each LPA antenna element 108 may include a vertical component 602a and a horizontal component 602b (relative to an arbitrary reference frame).

Figure 6B:
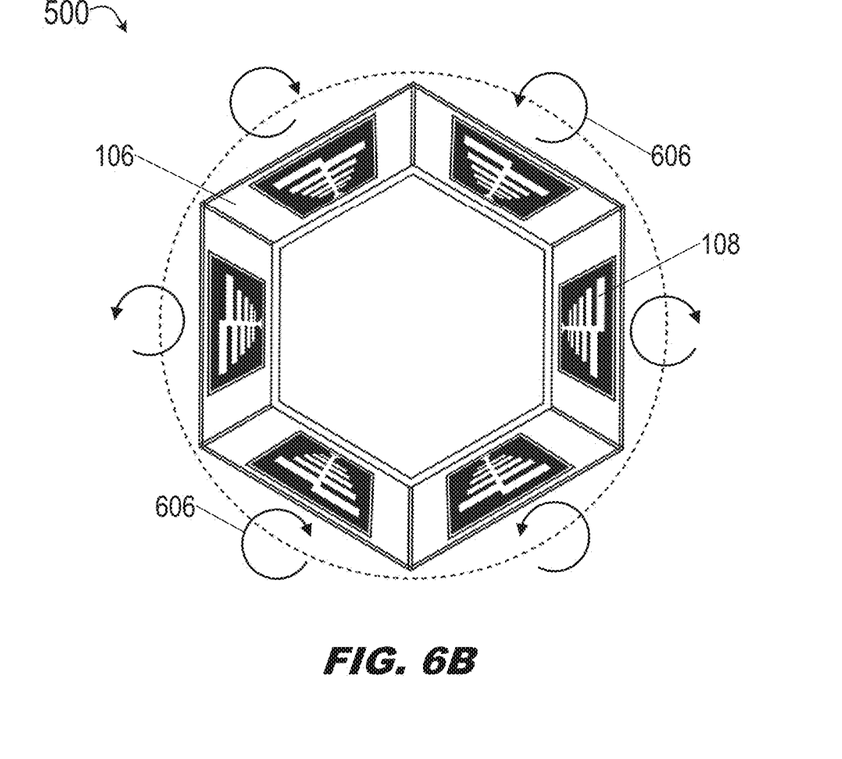
FIG. 6B is a longitudinal view of the DF array of FIG. 1 wherein the DF antenna elements are configured for circular polarization.

In embodiments, the hexagonal tipping about the nosecone assembly 110 of the two LPA antenna elements 108b immediately adjacent on either side to any given third LPA antenna element 108a may enhance the low-angle elevation gain of said third LPA antenna element in the perpendicular plane 602, as though said third LPA antenna element was mounted on a three-sided sloped ground plane.

in some embodiments, referring also to FIG. 6B, the polarization of some or all LPA antenna elements 108 of the DF array 500 may vary from the perpendicular polarization 602 shown by FIG. 6A. For example, one or more of the LPA antenna elements 108 may be configured for circular or elliptical polarization 606. In some embodiments, the polarization of each individual LPA antenna element 108 (e.g., whether perpendicular, circular, or some other desired polarization) may be "dialed in", or individually adjusted according to environmental conditions and/or mission priorities.

For example, the horizontal and vertical components 602a, 602b of the perpendicular polarization state 602 may be adjusted to fine-tune forward-looking or terrain-looking capacities of each individual LPA antenna element 108.

Figure 6C:
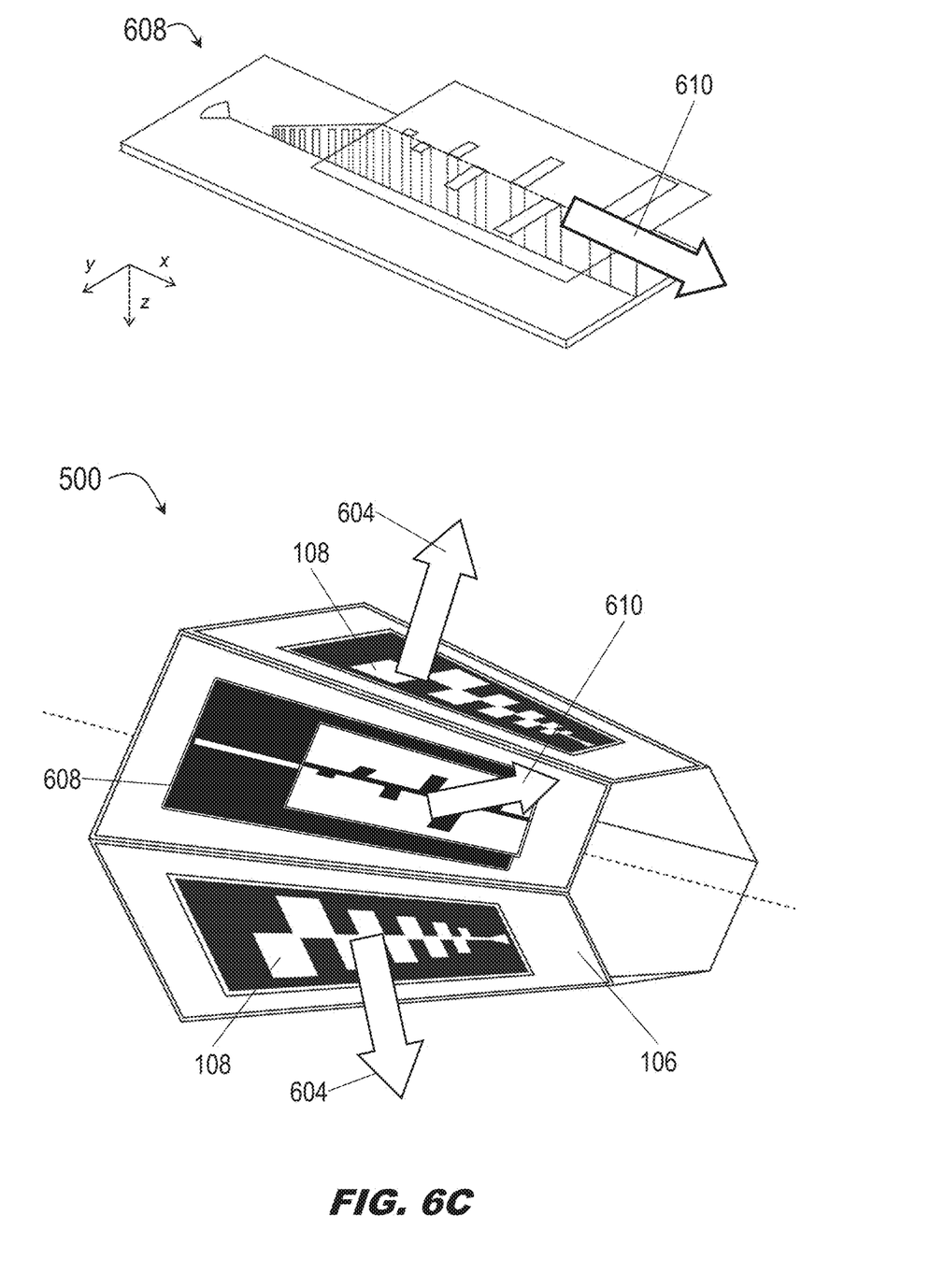
FIG. 6C is a longitudinal and isometric view of the DF array of FIG. 1 reconfigured to redirect end-fire radiation with respect to the DF antenna elements.

Referring now to FIG. 6C, the LPA antenna element 608 may be implemented and may function similarly to the LPA antenna elements 108 of FIG. 1, except that the LPA antenna element may be a microstrip monopole log periodic array (MSMPLPA) antenna element. For example, the MSMPLPA antenna element 608 may favor a radiation gain pattern 610 parallel (rather than perpendicular (604, FIG. 6A)) to its local ground plane 608, with a null perpendicular to the local ground plane. Accordingly, while the MSMPLPA antenna elements 608 may be more difficult and/or complex to implement than the MSLPA antenna elements 108 shown by, e.g., FIGS. 6A and 6B, the MSMPLPA antenna elements may enhance desirable forward-looking capacity of the DF array 500.

In some embodiments, one of more elements of the DF array 500 may incorporate MSMPLPA antenna elements 608. For example, the six-element DF array 500 may incorporate an interwoven or alternating 3-element MSLPA array (e.g., of three LPA antenna elements 108) and 3-element MSMPLPA array (e.g., three MSMPLPA antenna elements 608) to enable both perpendicular and parallel (604, 610) pattern coverage.

Figure 7A:
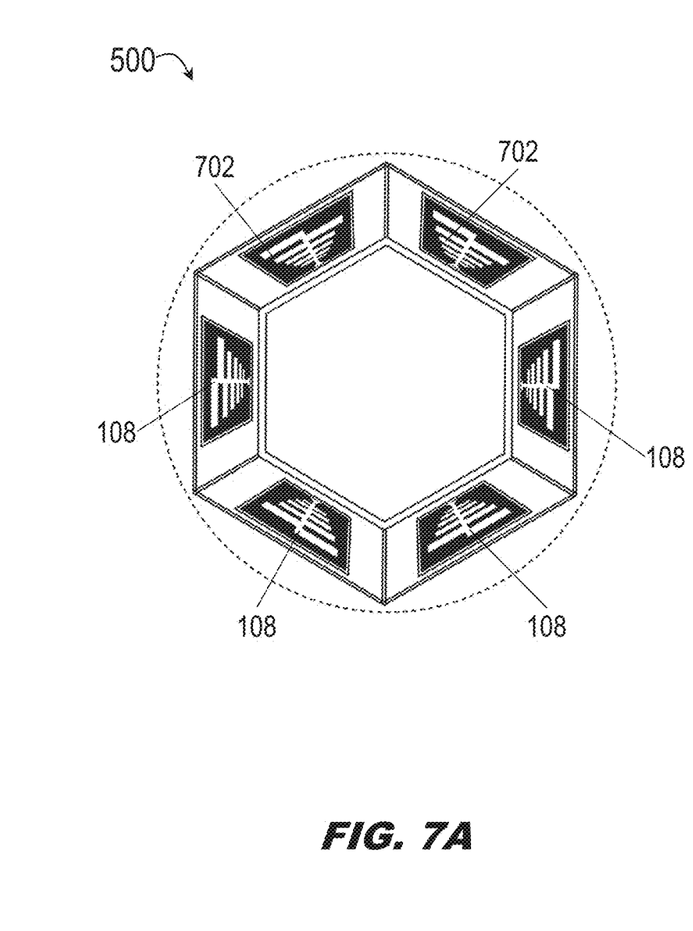
FIG. 7A is a longitudinal view of the seeker system of FIG. 1 illustrating terrain-oriented coverage by individual antenna elements of the DF array.

Referring now to FIG. 7A, the DF array 500 is shown in longitudinal view.

In embodiments, when the baseline DF array 500 is oriented as shown by FIG. 7A, at least four LPA antenna elements 108 may be oriented for terrain-looking signal detection (with the other two LPA antenna elements 702 oriented skyward, or "shadowed"). Similarly, due to the roll-symmetric design of the DF array 500, the DF array is adaptable to changes in roll angle on the part of the guided munition (302, FIG. 3).

In embodiments, the seeker system 100 may compensate for shadowed LPA antenna elements 702 by de-selecting any such antenna elements oriented away from the current detection operation. For example, the RF processors 210 may de-select, or disregard, detection input (402, FIG. 4) from any shadowed LPA antenna elements 702 (e.g., or corresponding parallel RF channel (404, FIG. 4)) in favor of the remaining terrain-oriented LPA antenna elements 108.

Figure 7B:
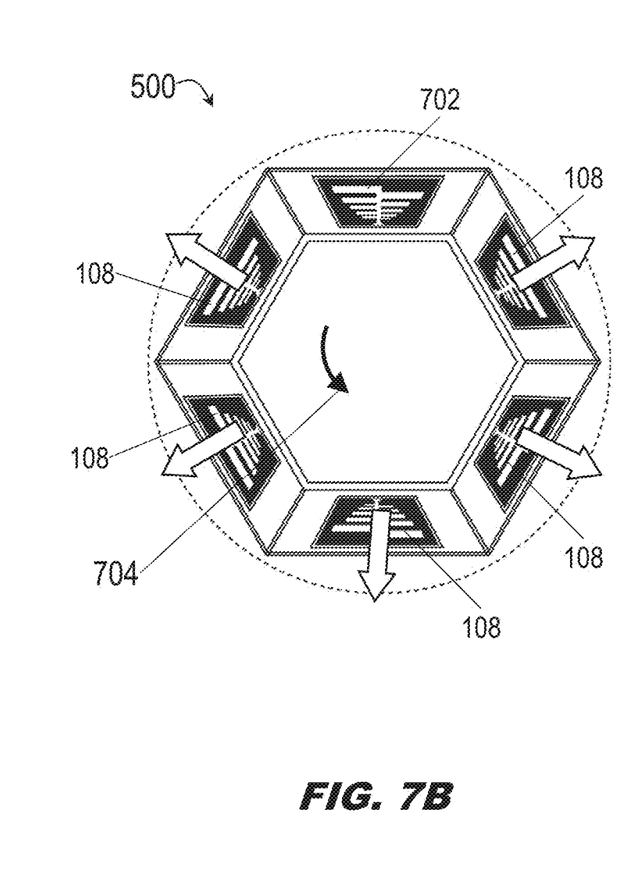
FIG. 7B is a longitudinal view of the seeker system of FIG. 7A wherein the DF array is reoriented to maximize terrain-oriented coverage by the antenna elements of the DF array.

Referring also to FIG. 7B, in some embodiments the seeker system 100 may further compensate for, or minimize, the number of shadowed LPA antenna elements 702 by requesting or initiating (e.g., via the guidance system (408, FIG. 4)) a roll angle adjustment 704 of the guided munition 302. For example, relative to the orientation of the DF array 500 as shown by FIG. 7A, a counterclockwise roll angle adjustment 704 may reorient the DF array 500 so that five LPA antenna elements 108 (rather than four) may engage in terrain-looking signal detection, and only one LPA antenna element 702 remains shadowed.

Figure 8A:
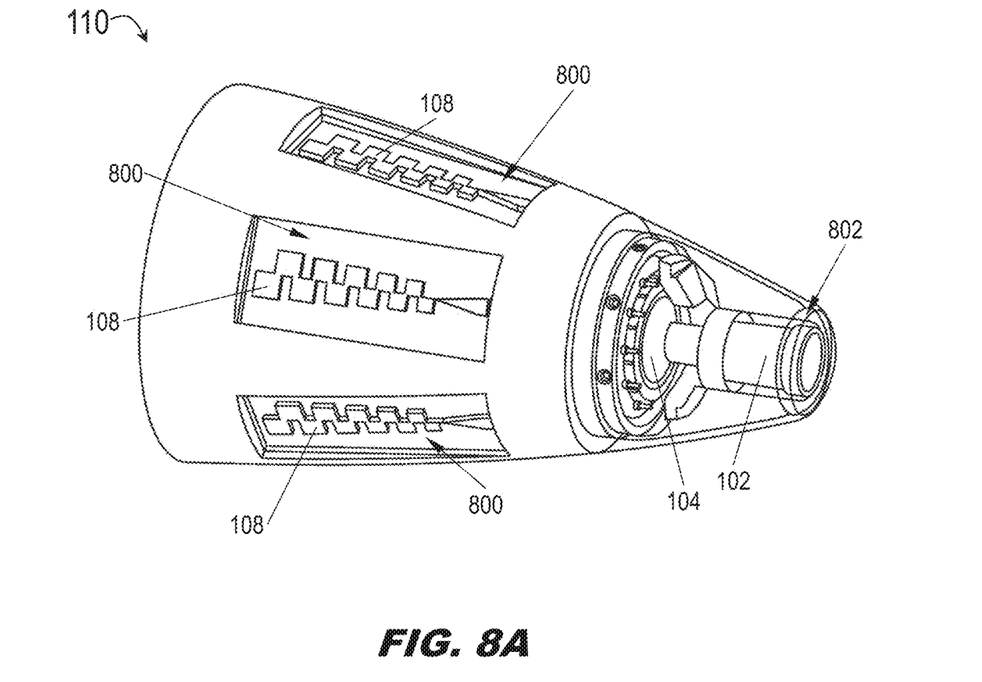
FIG. 8A is an isometric view of the seeker system of FIG. 1 illustrating the outer nosecone of the embodying guided munition and radome associated with the seeker system.

Referring now to FIG. 8A, the nosecone assembly 110 of the guided munition 302 is shown.

In embodiments, the nosecone assembly 110 may include a set of N individual radomes 800 integrated thereinto. For example, each radome 800 may include a locally planar dielectric surface or superstrate integrated above each LPA antenna element 108 to minimize the recess of each LPA antenna element relative to the nosecone assembly, minimizing aerodynamic drag and/or low-angle radiation distortion associated with the LPA antenna element. Similarly, an apex radome 802 may substantially comprise the terminal end or tip of the nosecone assembly 110, shielding the optical elements 102 and/or electronics stack 104.

Figure 8B:
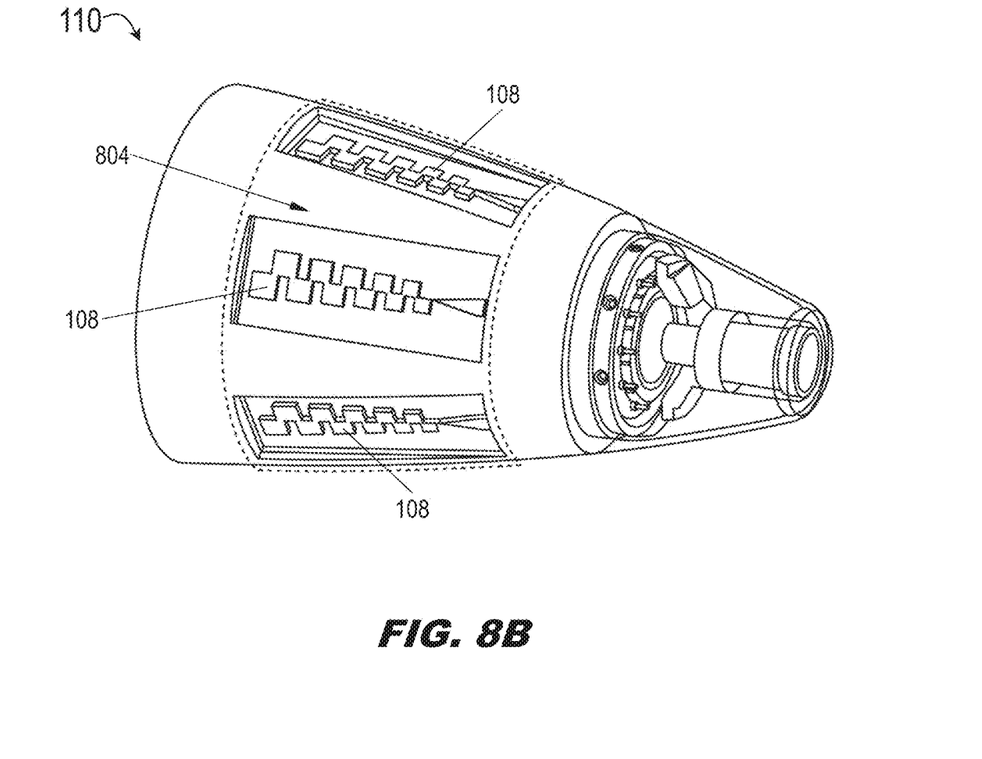
FIG. 8B is an isometric view of the seeker system of FIG. 1 illustrating an alternative nosecone radome configuration.

In some embodiments, referring now to FIG. 8B, the nosecone assembly 110 may instead incorporate a single continuous circumferential "collar" radome 804 spanning the full circumference of the nosecone assembly 110 adjacent to the full set of N LPA antenna elements 108. For example, the collar radome 804 may be a thin-walled, hollow sleeve slipped around, or bonded to, the nosecone assembly 110. In some embodiments, the collar radome 804 may instead be generated via deposition.

In some embodiments, one or more individual radomes 800 may incorporate a bandpass frequency selective surface (FSS) configured to allow desirable frequency bands or sub-bands to pass to or from the underlying LPA antenna element 108 while blocking undesirable frequencies. Further, in some embodiments a bandpass FSS radome 800 may be tunable (e.g., via the RF processor (206, FIG. 2B)), such that different frequency ranges to be passed or blocked by the radome may be adjusted.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. An integrated imaging and passive seeker system for a guided munition, comprising:
    an electro-optical infrared (EOIR) imaging system mountable within a nosecone of a guided munition, the EOIR imaging system comprising:
        at least one optical element disposed proximate to a forward radome, the forward radome corresponding to a tip of the nosecone;
        and
        at least one EOIR imager disposed within an electronics stack mountable behind the at least one optical element, the EOIR imager configured to sense image data associated with at least one target via the at least one optical element;
    and
    a passive direction finding (DF) sensor system mountable within the nosecone and comprising:
        a tapered conical ground chassis having an N-sided polygonal cross section with respect to its longitudinal axis, where N is an integer not less than 3;
        a plurality of N log periodic array (LPA) antenna elements, each LPA antenna element disposed on one of the N sides of the ground chassis proximate to the nosecone, the plurality of LPA antenna elements electromagnetically shielded from the EOIR imaging system by the ground chassis, each LPA antenna element configured to:
            produce a detection input by transmitting and receiving RF energy associated with at least one frequency band in the ultra-wide band (UWB) frequency range not less than 2 GHZ and not more than 18 GHZ;
        and
        at least one RF integrated circuit (RFIC) disposed within the electronics stack and operatively coupled to the plurality of N LPA antenna elements via at least one dedicated RF channel, the at least one RFIC configured for:
            receiving, via the at least one dedicated RF channel, the detection input from the N LPA antenna elements;
            identifying, based on the detection input, one or more signals of interest (SoI) associated with the at least one target, each SoI associated with a frequency sub-band within the UWB range;
            determining directional data associated to at least one selected SoI of the one or more SoI, based on the sub-band associated with the selected SoI;
        and
        providing the directional data to a guidance system of the munition.

2. The integrated imaging and passive seeker system of claim 1, wherein:
    the plurality of N LPA antenna elements is a plurality of N microstrip log periodic array (MSLPA) antenna elements.

3. The integrated imaging and passive seeker system of claim 1, wherein N is an even number.

4. The integrated imaging and passive seeker system of claim 3, wherein the plurality of N LPA antenna elements includes:
    a first set of N/2 first-band LPA antenna elements configured for operation within at least one first sub-band of the UWB frequency range, alternating with a second set of N/2 second-band LPA antenna elements configured for operation within at least one second sub-band of the UWB frequency range.

5. The integrated imaging and passive seeker system of claim 3, wherein the plurality of N LPA antenna elements includes:
    a set of N/2 first LPA antenna elements, each first LPA antenna element disposed on a side of the ground chassis such that a phase center of the first LPA antenna element migrates forward as a UWB frequency scanned by the first LPA antenna element increases;
    and
    a set of N/2 second LPA antenna elements alternating with the set of first LPA antenna elements; each second LPA antenna element disposed on a side of the ground chassis such that a phase center of the second LPA antenna element migrates rearward as a UWB frequency scanned by the second LPA antenna element increases.

6. The integrated imaging and passive seeker system of claim 3, wherein the plurality of N LPA antenna elements includes:

a set of N/2 first LPA elements configured for scanning the UWB frequency range in a direction perpendicular to a ground plane of the LPA antenna element;
and
a set of N/2 second LPA elements alternating with the set of first LPA elements, each second LPA element configured for scanning the UWB frequency range in a direction substantially parallel to the longitudinal axis of the ground chassis.

7. The integrated imaging and passive seeker system of claim 6, where the set of N/2 second LPA elements is a set of monopole LPA antenna elements.

8. The integrated imaging and passive seeker system of claim 1, wherein the plurality of N LPA antenna elements is a plurality of N monopole LPA antenna elements.

9. The integrated imaging and passive seeker system of claim 1, wherein each LPA antenna element is configured for scanning the UWB frequency range in a direction perpendicular to a ground plane of the LPA antenna element.

10. The integrated imaging and passive seeker system of claim 1, where the plurality of N LPA elements includes at least one circularly or elliptically polarized LPA element.

11. The integrated imaging and passive seeker system of claim 1, wherein the RFIC is configured to reorient the passive DF sensor system with respect to at least one ground-based target by initiating a rotation of the guided munition relative to the longitudinal axis.

12. The integrated imaging and passive seeker system of claim 1, wherein:
the plurality of N LPA antenna elements includes at least one shadowed antenna element oriented away from an identified SoI;
and
wherein the RFIC is configured to disregard the detection input from the at least one shadowed antenna element with respect to the identified SoI.

13. The integrated imaging and passive seeker system of claim 1, wherein:
the detection input provided by each of the N LPA elements is a single-ended input;
wherein each dedicated RF channel includes at least one balun;
and
wherein the RFIC receives via each dedicated RF channel a differential detection input based on the single-ended detection input provided by the corresponding LPA antenna element.

14. The integrated imaging and passive seeker system of claim 1, wherein:
the RFIC receives via each dedicated RF channel a differential detection input from the corresponding LPA antenna element.

15. The integrated imaging and passive seeker system of claim 1, wherein the plurality of N LPA elements is disposed on the sides of the ground chassis in an aperiodically spaced relationship.

16. The integrated imaging and passive seeker system of claim 1, wherein each LPA antenna element is disposed proximate to a dedicated radome set into the nosecone.

17. The integrated imaging and passive seeker system of claim 16, wherein at least one dedicated radome includes a bandpass frequency selective surface (FSS) structure configured to pass at least one selected UWB frequency range and to block at least one excluded UWB frequency range.

18. The integrated imaging and passive seeker system of claim 17, wherein the at least one bandpass FSS structure includes at least one tunable FSS structure configurable by the RFIC for the at least one selected UWB frequency range and the at least one excluded UWB frequency range.

19. The integrated imaging and passive seeker system of claim 1, wherein the plurality of LPA antenna elements is collectively disposed proximate to a circumferential radome set into the nosecone.

20. The integrated imaging and passive seeker system of claim 1, further comprising:
an active seeker radar mountable within the nosecone and comprising at least one active array of directional RF antenna elements mounted forward of the electronics stack and canted in a forward-looking direction, the at least one active array configured to produce active detection input by transmitting and receiving energy associated with one or more of the Ka-band or the W-band;
and
wherein the RFIC is operatively coupled to the at least one active array by at least one active RF channel, the RFIC further configured to:
receive the active detection input from the at least one active array;
and
provide the active detection input to the guidance system.

* * * * *